Patented Nov. 1, 1949

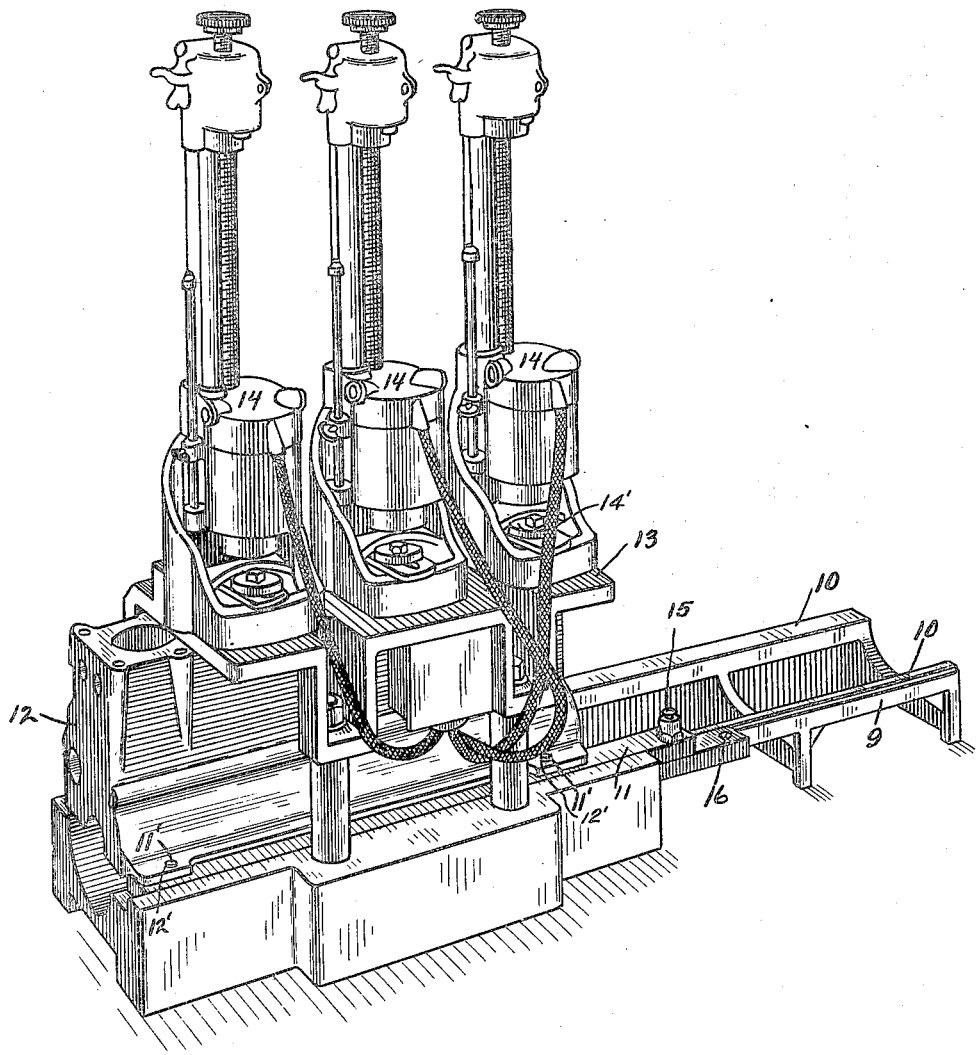

2,486,813

UNITED STATES PATENT OFFICE 2,486,813

CYLINDER REBORING MACHINE

Charles W. Yount, Indianapolis, Ind.

Application November 19, 1945, Serial No. 629,335

5 Claims. (Cl. 77—63)

The object of my invention is to provide an improved mechanism by which cylinders of standard automotive engines may be accurately rebored more rapidly and at less cost than has heretofore been thought possible.

The accompanying drawing is a perspective view of an embodiment of my invention.

In the drawing, 9 indicates a substantial base having a pair of parallel tracks 10, 10 one of which is lower than the other and supplemented by a slide bar 11, the upper surface of which is level with the upper surface of the companion track 10 and adapted to support a standard cylinder block 12. Bar 11 is provided with a pair of upstanding pins 11', 11' properly spaced to enter, and accurately fit, perforations 12', 12' in the lower flange of block 12. Perforations 12', 12' are the standard perforations provided by the engine builder for the reception of bolts which connect the cylinder block and subject crank case (not shown).

Arranged over track 10 and vertically spaced therefrom slightly more than the height of block 12 is a vertically-perforated bridge plate 13 supporting a plurality of boring units 14, 14 such as are now commonly in the market for reboring individual cylinders of a cylinder block.

These standard reboring units have lateral dimensions such that they cannot be arranged side by side closely enough to simultaneously rebore immediately adjacent cylinders and, as now commonly used, must be individually accurately set and secured on the cylinder block for each reboring operation.

The accurate setting of such a reboring unit requires considerable time by a highly skilled and high priced mechanic.

Consequently, in my improved machine, designed in the present exemplification for operations on a six-cylinder engine block, the three vertical perforations in the bridge plate 13 are spaced for alignment with three alternate cylinders of the block 12 and the units 14 are secured to the bridge plate by adjustable fastening means 14' so as to accurately align with alternate cylinders of the block 12. When once accurately set, the apparatus may be operated by relatively unskilled labor to produce an accurate reboring as the most highly skilled labor could produce.

Bar 11 is provided with a catch pin 15 adapted to enter either one of two perforations 16 in the subjacent track 10, the perforations 16 being laterally spaced accurately to the distance between the axes of alternate cylinders of block 12.

Tracks 10 extend out beyond the bridge plate far enough to receive the cylinder block free from under the bridge plate.

The units 14 are accurately placed on the bridge plate in the factory and thereafter need no adjustment except for repair or replacement of a unit so that the user of my apparatus may utilize relatively unskilled labor in the general operation of the apparatus.

In use, slide 11 is moved out from under the bridge plate and a cylinder block 12 positioned thereon and the companion track 10 by means of pins 11'. The slide 11 and accompanying cylinder block 12 are shifted until pin 15 may enter one of perforations 16 at which time a group of alternate cylinders of block 12 is accurately aligned with the boring units. Block 12 is then firmly clamped on base 9 by suitable clamping means, whereupon the boring units are operated through their cycle. Block 12 is then shifted on base 9 until pin 15 registers with the other perforation 16 and the operation repeated.

I have found in practice that, with apparatus of this kind, each designed for a particular make of multi-cylinder engines, worn cylinders may be rebored to the highest degree of accuracy by relatively unskilled labor.

I claim as my invention:

1. Cylinder reboring apparatus comprising a main body having a track, a cylinder-block receptor slidable on said track and adapted to support a cylinder block with its cylinder ends exposed, means moving with said receptor and cooperable with parts of such block to locate the block in a predetermined relation to said receptor, a plurality of boring units supported by the main body with their axes in the plane common to the axes of the cylinders of a cylinder block positioned on said receptor, and laterally spaced to register with alternate cylinders of the block, and means definitely positioning said receptor in either of two positions spaced by an amount equal to cylinder spacing.

2. Cylinder reboring apparatus comprising a main body having two parallel tracks spaced apart a distance approximately equal to the width dimension of a cylinder block, a cylinder-block receptor bar slidable on one of said tracks, the other track and said bar being adapted to support a multi-cylinder block with its cylinder ends exposed, a plurality of boring units supported by the main body with their axes in the plane common to the axes of the cylinders of a block positioned on said receptor bar, and laterally spaced to register with alternate cylinders of the block, and means definitely positioning said receptor bar in either of two positions spaced by an amount equal to cylinder spacing.

3. Cylinder reboring apparatus comprising a main body having two parallel tracks spaced apart a distance approximately equal to the width dimension of a cylinder block, a cylinder-block receptor bar slidable on one of said tracks, the other track and said bar being adapted to support a multi-cylinder block with its cylinder ends exposed, a plurality of boring units supported by the main body with their axes in the plane common to the axes of the cylinders of a block positioned on said receptor bar, and laterally spaced to register with alternate cylinders of the block, said receptor bar being provided with a plurality of upstanding pins spaced to enter and accurately fit respective perforations in the lower flange of the block, said receptor bar being further provided with a catch-pin adapted to enter alternatively and accurately fit either of two perforations laterally spaced in its companion track by an amount equal to adjacent cylinder spacing.

4. Cylinder reboring apparatus comprising a main body having a track, a receptor shiftably supported on said track and adapted to support a multi-cylinder engine block with its open cylinder ends exposed, upwardly-projecting means on said receptor positioned for engagement in port means in the base of such an engine block for accurately locating such block relative to said receptor, a plurality of boring units supported by said body with their axes disposed in parallelism in the plane common to the axes of a series of cylinders of a block supported on said receptor, said unit axes being spaced apart, in said plane, a distance equal to twice the distance between adjacent cylinder axes, a catch element associated with said receptor, and means adjacent said track and cooperable alternatively with said catch element to hold said receptor in either of two positions on said track, one of such positions holding certain cylinders of a block supported on said receptor in coaxial relation with said units, and the other of said positions being removed from said one position a distance equal to the distance between adjacent cylinder axes.

5. Cylinder reboring apparatus comprising a main body provided with a support and with a trackway adjacent said support, a cylinder block receptor means adapted to receive and support a cylinder block with the open ends of its cylinders exposed, boring means comprising a plurality of boring units rigidly spaced from each other a distance equal to the spacing between the axes of alternate cylinders of said block, the axes of said units being disposed in mutual parallelism, one of said means being mounted on said support and the other of said means being mounted on said trackway with the boring unit axes disposed in the common plane of said cylinder axes, and indexing means including cooperating devices on said receptor means and on said trackway operative to hold a block mounted on said receptor means in position with certain of its cylinder axes aligned with said respective boring means in one position, and its alternate cylinders aligned with said respective boring means in another position.

CHARLES W. YOUNT.

REFERENCES CITED

The following references are of record in the file of this patent:

UNITED STATES PATENTS

| Number | Name | Date |
| --- | --- | --- |
| 1,046,394 | Kolassa | Dec. 3, 1912 |
| 1,732,560 | Johnson | Oct. 22, 1929 |
| 2,080,643 | Walther | May 18, 1937 |
| 2,211,784 | Johnson | Mar. 23, 1938 |
| 2,302,878 | Muhl et al. | Nov. 24, 1942 |
| 2,391,487 | Snader | Dec. 25, 1945 |
| 2,395,518 | Svenson | Feb. 26, 1946 |